May 24, 1960  J. V. INGOLD  2,937,763
SEED PACKET DISPLAY STAND
Filed Oct. 2, 1958  2 Sheets-Sheet 1
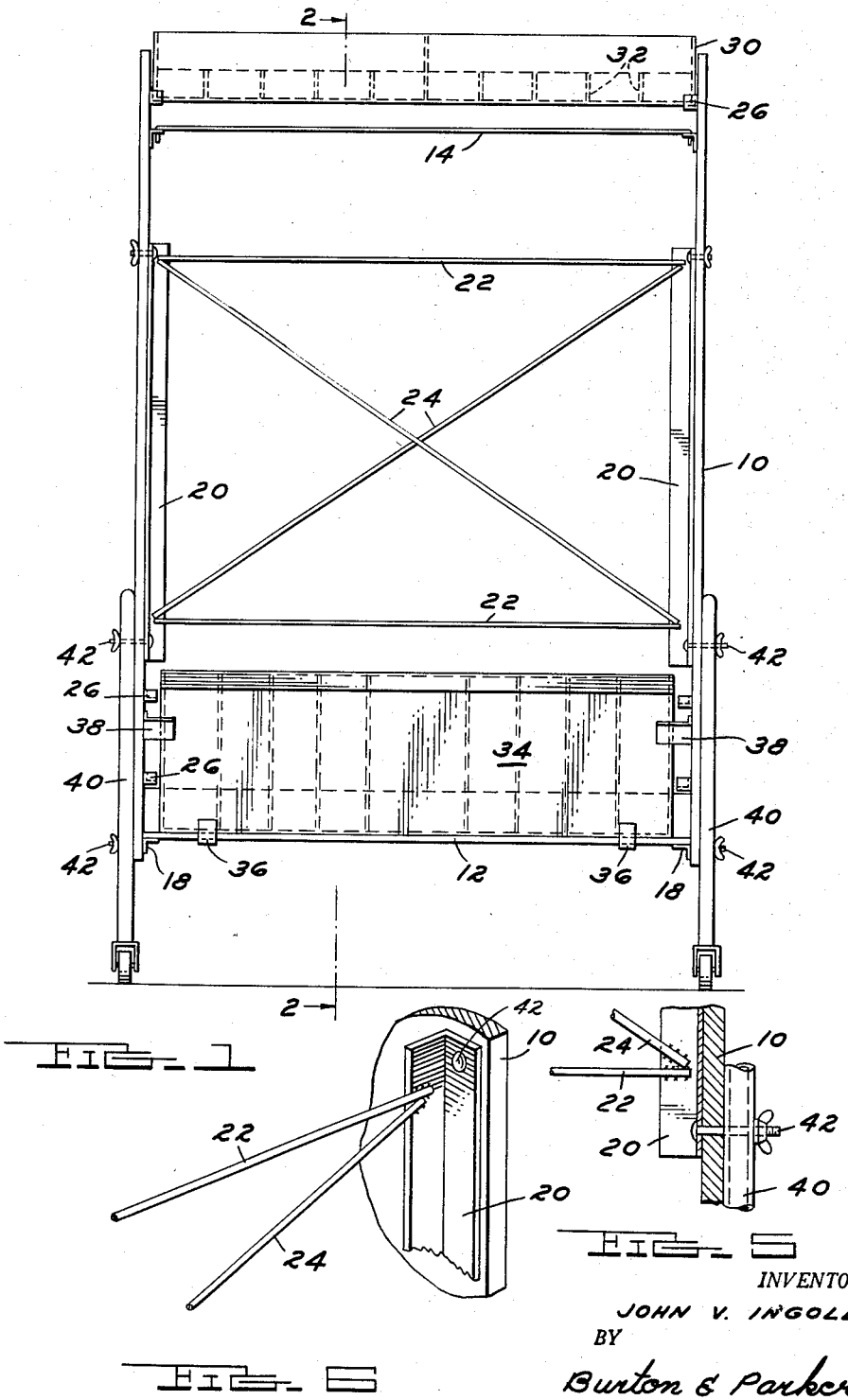
INVENTOR.
JOHN V. INGOLD
BY
Burton & Parker
ATTORNEYS May 24, 1960
J. V. INGOLD
2,937,763
SEED PACKET DISPLAY STAND
Filed Oct. 2, 1958
2 Sheets-Sheet 2
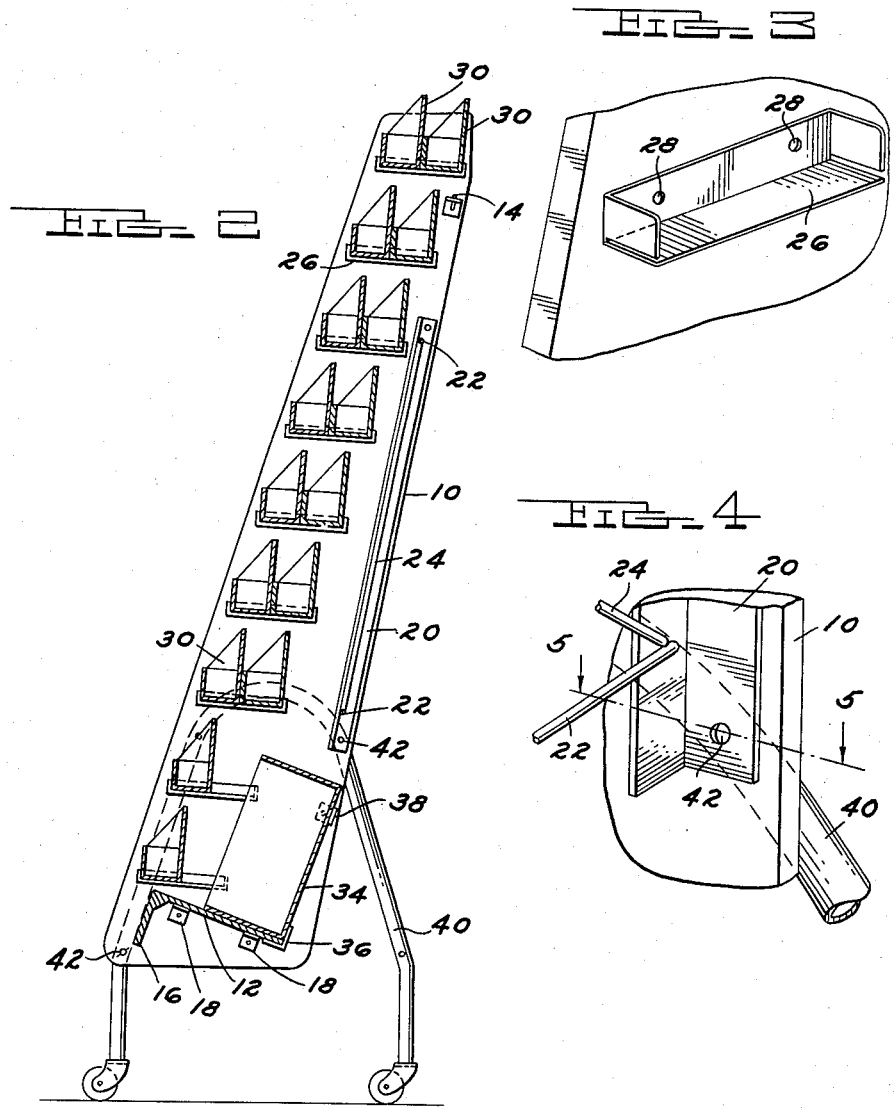
INVENTOR.
JOHN V. INGOLD
BY
Burton & Parker
ATTORNEYS

United States Patent Office 2,937,763
Patented May 24, 1960

2,937,763

SEED PACKET DISPLAY STAND

John V. Ingold, Birmingham, Mich., assignor to Ferry-Morse Seed Co., Detroit, Mich., a corporation of Michigan Filed Oct. 2, 1958, Ser. No. 764,802

1 Claim. (Cl. 211—128)

This invention relates to an improved seed packet display stand wherein a large number of vegetable and flower seed packets may be displayed for sale.

An object is the provision of a seed packet display stand of the character described which is simple, inexpensive, and is designed to so support the seed packets that they are readily visible and are also easily accessible for customer selection.

Another object is the provision of a seed packet display stand of the character set forth which is adapted to be quickly assembled and disassembled so that it may readily be assembled for use or disassembled for storage and shipment.

A further object is the provision of a stand of the character specified which is light in weight, presents an attractive appearance, and is capable of supporting a large number of seed packets, and includes a plurality of removable seed packet display trays which are formed of translucent or transparent plastic so that the display on the packet is readily visible through the wall of the tray.

A meritorious feature is the provision of a construction wherein the seed packet display trays are arranged in pairs, one tray of each pair being disposed to the rear of the other tray of the pair. Each tray is removably supported within the stand. When the stand is disassembled for storage or shipment, the trays can be removed and stored within a separate container.

When the stand, trays, and seed packets are to be shipped, the stand itself may be packaged in one carton and the seed trays with seed packets therein may be packaged in another carton, and there is also included a large tray adapted to hold large packages of seeds such as beans, corn, or the like.

This seed packet display case constitutes an improvement upon the stand and shown in my application Serial No. 709,636, filed January 17, 1958.

Other objects, advantages, and meritorious features will more fully appear from the following description, claim, and accompanying drawings wherein:

Fig. 1 is a rear elevation of my improved seed packet display stand;

Fig. 2 is a vertical sectional view taken on the line 2—2 of Fig. 1;

Fig. 3 is a perspective of a fragment of a side wall of the stand showing a tray support;

Fig. 4 is a perspective of another fragment of the side wall showing the method of attachment of a removable leg thereto;

Fig. 5 is a sectional view taken on the line 5—5 of Fig. 4;

Fig. 6 is a perspective of another fragment of a side wall showing the connection of a part of the bracing frame to the side wall.

In Fig. 2 my seed packet display stand is shown in the upright position. The stand comprises two complementary generally upright side members 10 which may be formed of wood or the like. These side members are supported in spaced-apart relationship by intervening bracing and are so supported that as they project upwardly they slope somewhat rearwardly so that the display trays which are carried therebetween are readily visible and accessible.

The bracing which extends between the side walls comprises a bottom plate 12 and a top brace member 14. This top brace member may be in the form of a rod, wire, or the like. The bottom plate 12 may be of wood. It is shown in Fig. 2 as having a face plate portion 16 which may carry an advertising display card. The bottom board 12 is held in place by small bracket elements 18 which may be secured by bolts or the like to the side walls 10 and to the bottom plate itself. Two of these bracket pieces are shown in Fig. 2 as secured to one side wall 10. They are also secured to the bottom plate 12. Corresponding brackets would be secured to the opposite end of the bottom plate and to the opposite side wall. In addition to the top brace 14 and the bottom plate 12, there is an intermediate bracing frame shown particularly in Fig. 1 as extending between the intermediate portions of the side walls 10.

This bracing frame comprises two angular side rails 20 held in spaced-apart relationship by two transverse wires 22 and two diagonal wires 24. These wires or rods are welded at their ends or otherwise secured to the angular rails 20. The rails 20 are adapted to be bolted or otherwise fastened to the side plates 10 as shown in Figs. 1 and 6.

The two side plates 10 are provided with opposed complementary tray-supporting brackets 26. Such brackets are arranged in an upwardly spaced row or succession along the inner face of each side wall. Such are shown in Fig. 3 where one bracket 26 is illustrated as secured to a side wall 10 by bolts 28. Such bracket is of a size to receive the ends of two similar seed packet trays 30, arranged as a pair, and comprising a forward tray and an aft tray.

These trays may be formed of plastic or the like which is relatively transparent so that seed packets placed therein are readily visible throughout the entire expanse of the front face. Each tray is divided by partitions 32 into a plurality of compartments. Ten compartments are here shown. The individual seed packet trays are removably supported upon the brackets in a succession of pairs so that when the forward tray is empty it may be interchanged with the rearward tray or packets may be removed from the rearward tray and placed in the forward tray. This arrangement provides for the storage of a large number of seed packets which are readily accessible.

There is a large seed packet storage tray 34 which is removably supported upon the bottom plate 12 and is held in place by small lugs or brackets 36 secured to such bottom plate and projecting upwardly therefrom as shown in Figs. 1 and 2. This large tray 34 is further supported by a pair of brackets 38 secured to the side plates 10 and extending behind the rear wall of the tray 34 as shown in Fig. 2. The tray 34 is divided by partitions 36 into separate compartments as shown in Fig. 1 in dotted line.

This storage tray is supported upon the bottom piece 34 behind the two lower seed packet display trays as shown in Fig. 2. It will be noted that the two lower seed packet display trays are not provided in pairs. One such tray only is mounted on each of the two lower pairs of tray supporting brackets. The two lower seed packet display trays may carry large seed packets such as beans or corn and a reserve supply can be kept in storage tray 34.

What I claim is:

A seed packet display stand comprising, in combination, two opposed complementary upright side walls, a pair of legs removably secured to the lower end of each of said side walls, a bottom element and bracing member extending removably between the lower ends of said two side walls, a top bracing member extending removably between the upper ends of the said two side walls, and a bracing frame comprising opposed complementary angular side rails and transverse and diagonal cross pieces extending between said side rails, said frame disposed removably between the intermediate portions of said two side walls adjacent to the rear edges thereof and between the top and bottom bracing members with the angular side rails overlying and secured removably to said side walls, said two side walls provided on their inner faces forwardly of said bracing frame with complementary rows of upwardly spaced oppositely positioned complementary seed tray supporting brackets, a plurality of pairs of similar fore and aft seed packet display trays independently removably supported one pair upon each of said opposed complementary brackets except the two lower brackets, a single seed packet display tray supported upon each of said two lower opposed complementary brackets, a seed packet storage tray removably supported upon the bottom element to the rear of the two single seed packet display trays and having a height sufficient to overlap both of said two lower single seed packet display trays.

References Cited in the file of this patent

UNITED STATES PATENTS

| | | |
|---|---|---|
| 1,716,964 | Kuck | June 11, 1929 |
| 2,075,320 | Williams | Mar. 31, 1937 |
| 2,192,243 | Rogers | Mar. 5, 1940 |
| 2,545,255 | Broce | Mar. 13, 1951 |